Sept. 1, 1959  W. P. McDONOUGH  2,902,233
REELING APPARATUS
Filed July 24, 1957  2 Sheets-Sheet 2
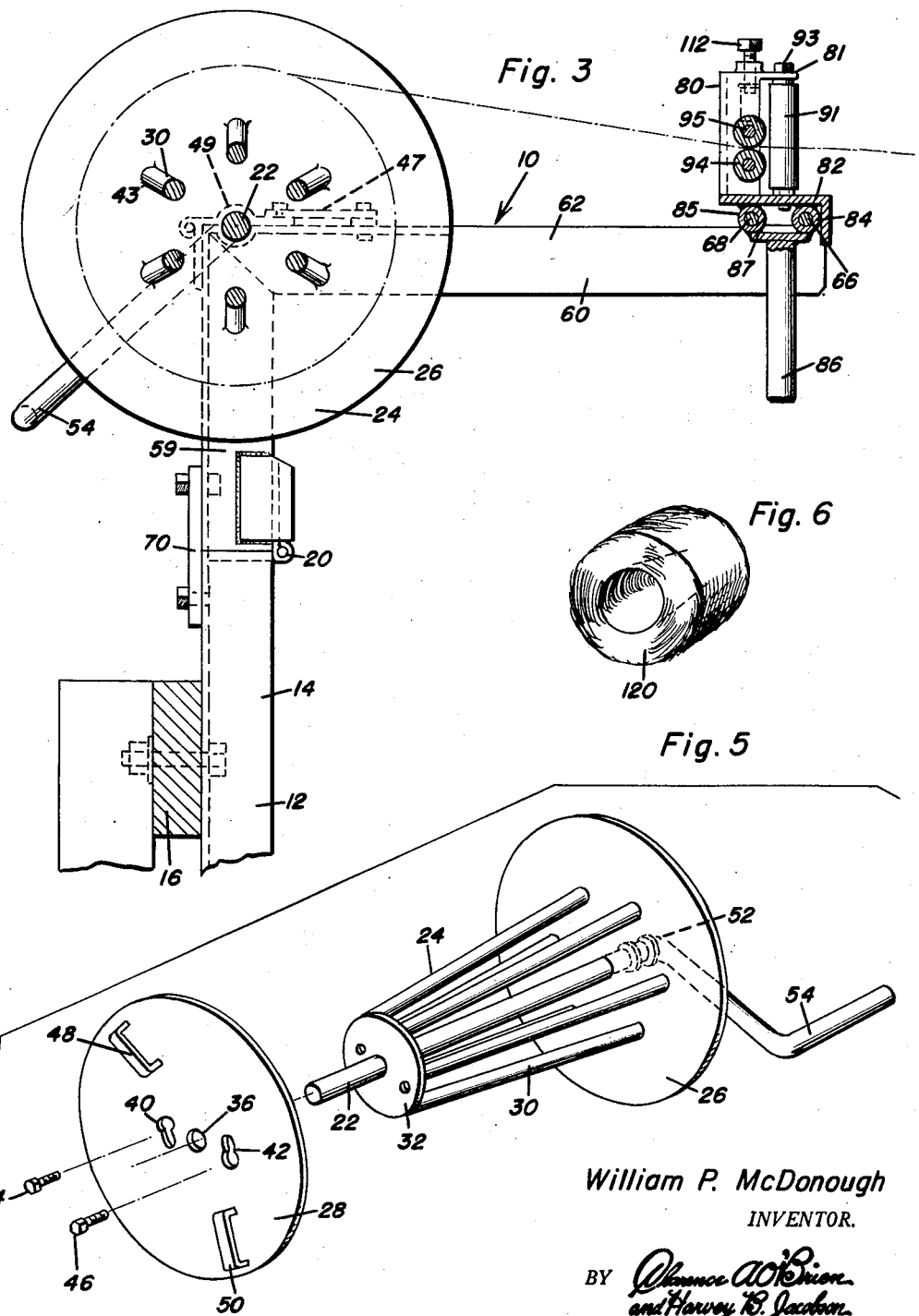
William P. McDonough
INVENTOR.

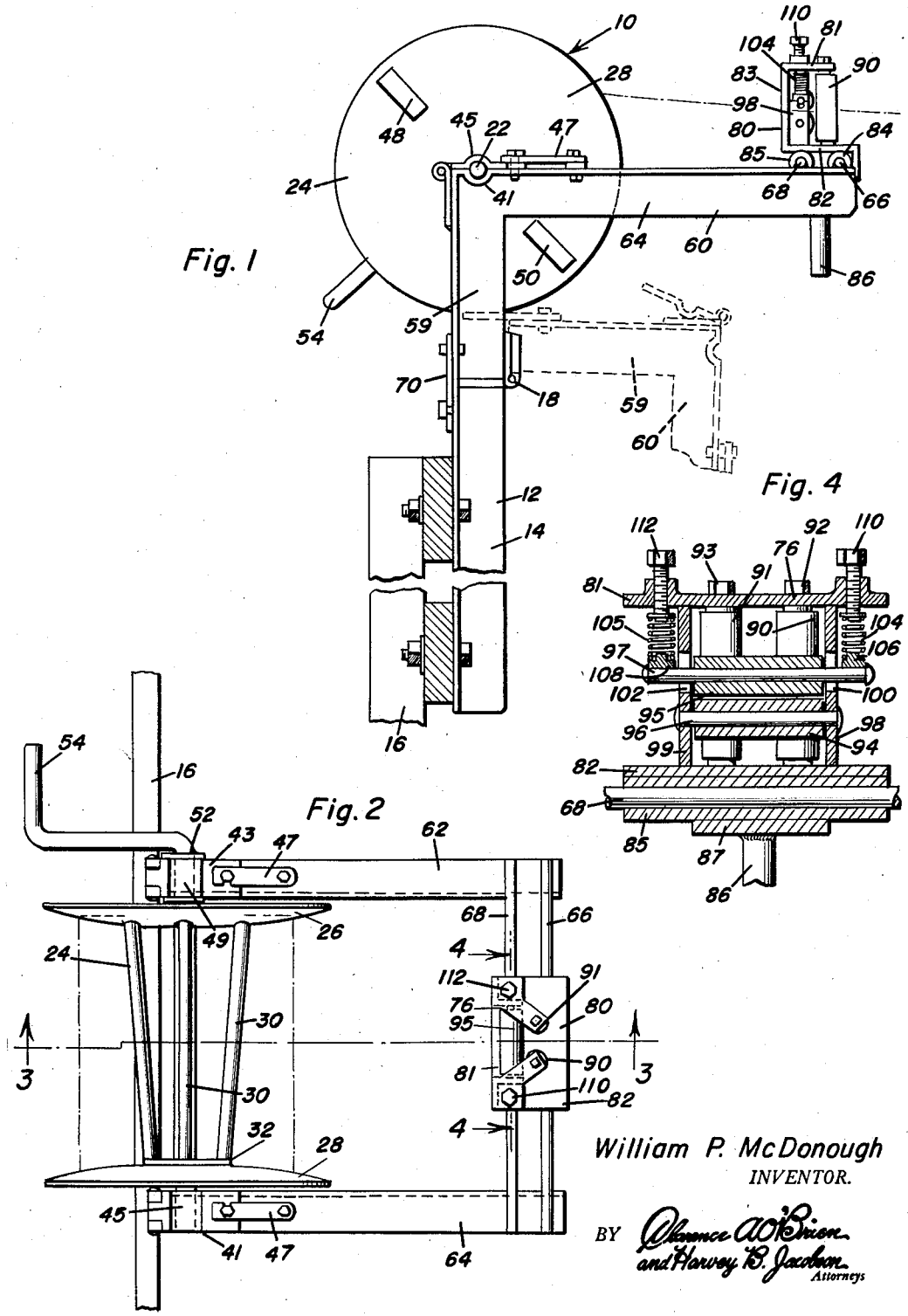

United States Patent Office 2,902,233
Patented Sept. 1, 1959

2,902,233
REELING APPARATUS
William P. McDonough, Saguache, Colo.

Application July 24, 1957, Serial No. 673,942

2 Claims. (Cl. 242—85)

This invention relates to a wire or twine reel together with means with which the reel is adapted to be used for the purpose of accumulating wire or twine from baled hay or for similar purposes.

The disposal of wire or twine when feeding baled hay to a large number of cattle or sheep, poses quite a problem. The hay wire is difficult to handle and moreover, tends to accumulate at random thereby causing an additional subsequent problem of collection. This invention makes possible convenient handling of such wire by extracting it from the baled hay and at the same time winding it on a reel of the type which has a removable end plate so that not only is the wire collected in a neat roll, but also the wire is capable of producing revenue in that in the rolled condition, it may be sold for scrap metal.

Another object of the invention is to provide a frame within which to accommodate a reel, the frame being swingable to adjusted positions and supporting a wire guide and tension device which cooperates with the wire to both feed the wire on the reel and also to maintain the correct tension on the wire as it is being wound on the reel.

Baling wire that has been used has many places which snag clothing and catch on corners, etc. The wire guide makes it unnecessary to feed the wire by hand. Hand feeding wears out gloves very fast and often injures the hands. Accordingly, it is a further object of the invention to provide a device of the nature which is described wherein the wire guide obviates the above difficulties encountered in winding or otherwise collecting used baling wire or twine.

An important feature of the invention is the mechanical arrangement of the frame that supports the wire guide and tension device. A frame is pivoted to a stand, and the upper surface of the frame accommodates the reel spindle. When the frame is in one position that is, the position for feeding and automatically tensioning the wire, the reel spindle is held captive in its bearings by the frame fitting over the bearings. But, when the frame is moved to another position, the reel may be removed laterally from the reel spindle bearings for subsequent emptying. Accordingly the loaded reel need not be lifted during its removal.

Other objects and advantages will become evident in the following description.

Figure 1 is an elevational view of one form of the invention;

Figure 2 is a top plan view of the wire handling apparatus of Figure 1;

Figure 3 is a sectional view taken on the line 3—3 of Figure 2;

Figure 4 is an enlarged sectional view taken on the line 4—4 of Figure 2 and showing the wire tensioning device;

Figure 5 is an exploded perspective view of the reel which is part of the invention; and Figure 6 is a perspective view of a roll of tightly wound used baling wire that has been rolled on the reel of Figure 5.

In the accompanying drawings there is shown a wire handling apparatus 10 which is constructed of a vertical support 12, the latter comprising two uprights 14 that are bolted or otherwise rigidly secured to a stationary structure 16. Hinges 18 and 20 are at the top ends of the uprights 14 of support 12 and they connect the shorter parts 59 of the L-shaped frame 60 to the uprights. The shorter parts 59 of the frame are generally rectangular. The longer part of the frame is constructed of two sides 62 and 64 whose outer ends are connected by a pair of rails 66 and 68, the latter being welded or otherwise rigidly held in place. The inner ends of the sides 62 and 64 are connected to parts 59 of the frame. The hinges 18 and 20 are arranged so that the frame 60 is capable of swinging from a horizontal position (Figure 1) on one side of the uprights to a vertical position as shown by the dotted lines. One or more latches 70 between the uprights and parts 59 of the frame releasably lock the frame in the horizontal position.

Reel 24 has two end plates 26 and 28 and a plurality of rods 30 welded or otherwise fixed to end plate 26. These rods taper inwardly toward a mounting plate 32 to which they are fixed. End plate 28, like end plate 26, is convex on the inner surface. Plate 28 is detachably secured to mounting plate 32 and has a hole 36 in its center. Spindle 22 which is rigidly secured to plate 26 and plate 32, has its end passed through hole 36. Keyhole slots 40 and 42 constitute part of the means for detachably securing plate 28 to plate 32. The remainder of these means consist of bolts 44 and 46, which are passed through the keyhole slots 40 and 42 and which are attached in the taped holes of mounting plate 32. Handles 48 and 50 on plate 28 are for the purpose of more easily handling the reel.

The outer end of spindle 22 is adapted to seat in the saddle bearing 41, while the bearing 52 located on the outer side of end plate 26 on spindle 22 is adapted to seat in the other saddle bearing 43. Bearings 41 and 43 are in frame 60 near parts 59, and they have hinged covers 45 and 49 releasably held in place by latches 47. Handle 54 at the end of spindle 22 is adapted to be manually rotated although spindle 22 may be power operated.

A wire guide and tensioning device 76 is mounted on the pair of rails 66 and 68 and is capable of being manually slid on the rails 66 and 68. The device 76 is made of a carriage that has frame 80 provided with upper and lower plates 81 and 82 respectively and vertical plate 83 connecting the two. Sleeves 84 and 85 are slidably disposed on the rails 66 and 68 and are welded or otherwise fixed to the lower plate 82 of the carriage. Handle 86 is welded to lower plate 87, the latter being welded to the lower surfaces of the two sleeves 84 and 85. With handle 86 the wire tensioning device carriage is capable of being slid from one end to the other end of the pair of rails 66 and 68.

Vertical rollers 90 and 91 that are mounted for rotation on spindles 92 and 93, constitute one pair of rollers of the wire guide and tensioning device. Spindles 92 and 93 are carried by the parallel plates 81 and 82 of the carriage. Horizontal rollers 94 and 95 are mounted on spindles 96 and 97 respectively. Spindle 96 is attached to the sides 98 and 99 of carriage 80 and has a fixed longitudinal axis. Spindle 97 is passed through slots 100 and 102 in sides 98 and 99 and is capable of being vertically moved. Springs 104 and 105 are disposed on shoes 106 and 108 which, in turn, seat upon the spindle 97 to apply a resilient spring load thereon at all times. Adjusting screws 110 and 112 that are threaded in openings in the upper plate 81 of the carriage, are capable of applying a selected compressive load in the springs 104 and 105 by merely adjusting the screws.

In use, reel 24 is assembled and placed in bearings 41 and 43. The wire or twine is passed through the two pairs of rollers of the wire tensioning device. The end of the wire is secured to the reel 24, and then the reel is ready to be rotated by its handle 54. During rotation of the reel the wire guide and tensioning device is slid from side to side on the track formed by its rails 66 and 68. This causes the wire to be wound neatly on reel 24 in order to form roll 120 which is typical of the rolls that are capable of being formed on the reel 24. After the reel has become full or at such time that it is otherwise desirable to empty reel 24, latches 70 are opened and frame 60 is swung to the position shown in dotted lines in Figure 1. After opening the bearing covers 45, 49, the reel 24 together with its load of wire may be removed laterally or horizontally from the bearings 41, 43 of the reel shaft 22, without having to lift the reel and shaft out of its bearings. Upon removal of the plate 28 the roll 120 of wire is then slipped from the group of bars 30 after which end plate 28 is replaced. When reel 24 is replaced in the support 12 the machine is ready for subsequent use.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a reeling apparatus, the combination of a pair of spaced uprights, an L-shaped frame including a pair of vertical portions constituting an upward continuation of the upper ends of said uprights and a pair of horizontal portions extending from the upper ends of said vertical portions to one side of the uprights, a set of hinges provided at the upper ends of said uprights at the same side thereof as said horizontal portions of said frame and connecting the uprights to said vertical portions of the frame, releasable locking means provided at the relatively opposite side of said uprights and on the adjacent side of the vertical portions of the frame whereby to lock said frame in an operative position wherein said horizontal portions thereof are horizontal and whereby when the locking means are released said frame may be swung downwardly on said hinges to a lowered position wherein the horizontal portions of the frame are substantially vertical, a pair of saddle bearings provided on the horizontal portions of said frame, a horizontal shaft removably and rotatably positioned in said bearings, a reel carried by said shaft, and means provided on the horizontal portions of the frame for removably retaining said shaft in said bearings.

2. The device as defined in claim 1 wherein said last mentioned means comprise a pair of bearing covers hingedly connected to the horizontal portions of said frame and coacting with the respective bearings, and releasable locking means provided on said frame for said covers.

References Cited in the file of this patent

UNITED STATES PATENTS

| | | |
|---|---|---|
| 1,316,972 | Prentiss | Sept. 23, 1919 |
| 1,775,707 | Van Hook | Sept. 16, 1930 |
| 2,203,435 | Kempe | June 4, 1942 |